(12) United States Patent
Nair et al.

(10) Patent No.: US 11,983,257 B2
(45) Date of Patent: May 14, 2024

(54) VOICE BIOMETRIC AUTHENTICATION SYSTEMS AND METHODS

(71) Applicant: PayPal, Inc., San Jose, CA (US)

(72) Inventors: Rahul Nair, Leander, TX (US); Elizabeth Therese Wilson, Maynooth (IE)

(73) Assignee: PAYPAL, INC., San Jose, CA (US)

( * ) Notice: Subject to any disclaimer, the term of this patent is extended or adjusted under 35 U.S.C. 154(b) by 231 days.

(21) Appl. No.: 17/531,034

(22) Filed: Nov. 19, 2021

(65) Prior Publication Data
US 2023/0161853 A1 May 25, 2023

(51) Int. Cl.
G06F 21/00 (2013.01)
G06F 21/32 (2013.01)
G10L 17/06 (2013.01)
H04W 4/021 (2018.01)

(52) U.S. Cl.
CPC ............ *G06F 21/32* (2013.01); *G10L 17/06* (2013.01); *H04W 4/021* (2013.01)

(58) Field of Classification Search
None
See application file for complete search history.

(56) References Cited

U.S. PATENT DOCUMENTS

| | | | | |
|---|---|---|---|---|
| 9,569,605 B1 * | 2/2017 | Schneider | ............. | H04L 9/3231 |
| 2010/0076770 A1 * | 3/2010 | Ramaswamy | .......... | G10L 17/06 |
| | | | | 704/E21.001 |
| 2016/0365095 A1 * | 12/2016 | Lousky | .................... | G10L 17/04 |
| 2018/0287809 A1 * | 10/2018 | DeLapa | ................ | H04M 3/568 |
| 2019/0035407 A1 * | 1/2019 | Keret | ....................... | G10L 17/24 |
| 2019/0341055 A1 * | 11/2019 | Krupka | ................... | G10L 17/02 |
| 2020/0019688 A1 * | 1/2020 | Jhawar | .................... | G10L 17/24 |
| 2020/0285725 A1 * | 9/2020 | Dong | ................. | G06F 3/04883 |
| 2021/0104246 A1 * | 4/2021 | Jolly | ....................... | G10L 17/02 |
| 2022/0029981 A1 * | 1/2022 | Mavani | .................. | G06F 3/167 |
| 2022/0392455 A1 * | 12/2022 | Ma | ........................ | H04L 67/306 |

* cited by examiner

*Primary Examiner* — Jeffrey C Pwu
*Assistant Examiner* — William A Corum, Jr.
(74) *Attorney, Agent, or Firm* — Haynes and Boone, LLP

(57) ABSTRACT

Systems and methods for voice authentication are disclosed. In an embodiment, a computer system may determine that a user is eligible for establishing a voice authentication capability for a user account during a real-time audio communication between a user device corresponding to the user and a communication system associated with an electronic service provider. The computer system may enhance a recording quality of a portion of the real-time audio communication and record a voice sample for the portion of the real-time audio communication at the enhanced recording quality. The computer system may generate a voiceprint based on the voice sample and enable the voice authentication capability such that the user can be authenticated by voice in future audio communications with the communication system in a minimally intrusive fashion where normal conversation can be used to capture voice samples which can be compared to the voiceprint to authenticate the user.

20 Claims, 8 Drawing Sheets

VOICE BIOMETRIC AUTHENTICATION SYSTEMS AND METHODS

TECHNICAL FIELD

The present disclosure generally relates to biometric authentication and more particularly to for enabling voice biometric authentication according to various embodiments of the present disclosure.

BACKGROUND

Voice authentication enrollment typically involves processing a sample of a user's voice to generate an acoustic model or "voiceprint" that represents acoustic characteristics unique to the user's voice. During a voice authentication process for access to services or content via a computer system or other electronic device, a voice sample of a user to be authenticated is received and a voiceprint is generated based on the received voice sample. The voiceprint generated during the voice authentication may be compared to the voiceprint generated at enrollment to compute an authentication score indicating how closely matched the two voice samples are, and consequently the likelihood that the user is who they are claiming to be. In the case of a legitimate user, the expectation is that their voiceprint during the voice authentication process will closely match the voiceprint generated at enrollment, which should result in a sufficient authentication score to authenticate the user. By contrast, in another case in which a different user, such as an imposter, is attempting to access the computer system, the expectation is that the imposter's voiceprint will not closely match the legitimate user's enrolled voiceprint, thus resulting in an insufficient authentication score and a failure to authenticate the different user. While voiceprints may provide higher security (e.g., harder for an imposter or fraudster to replicate a voice as compared to PINs or passwords), it maybe difficult for a system to obtain a high enough quality voice sample for use in authentication and it maybe cumbersome for the user to provide such a voiceprint for authentication purposes.

Figure 1A:
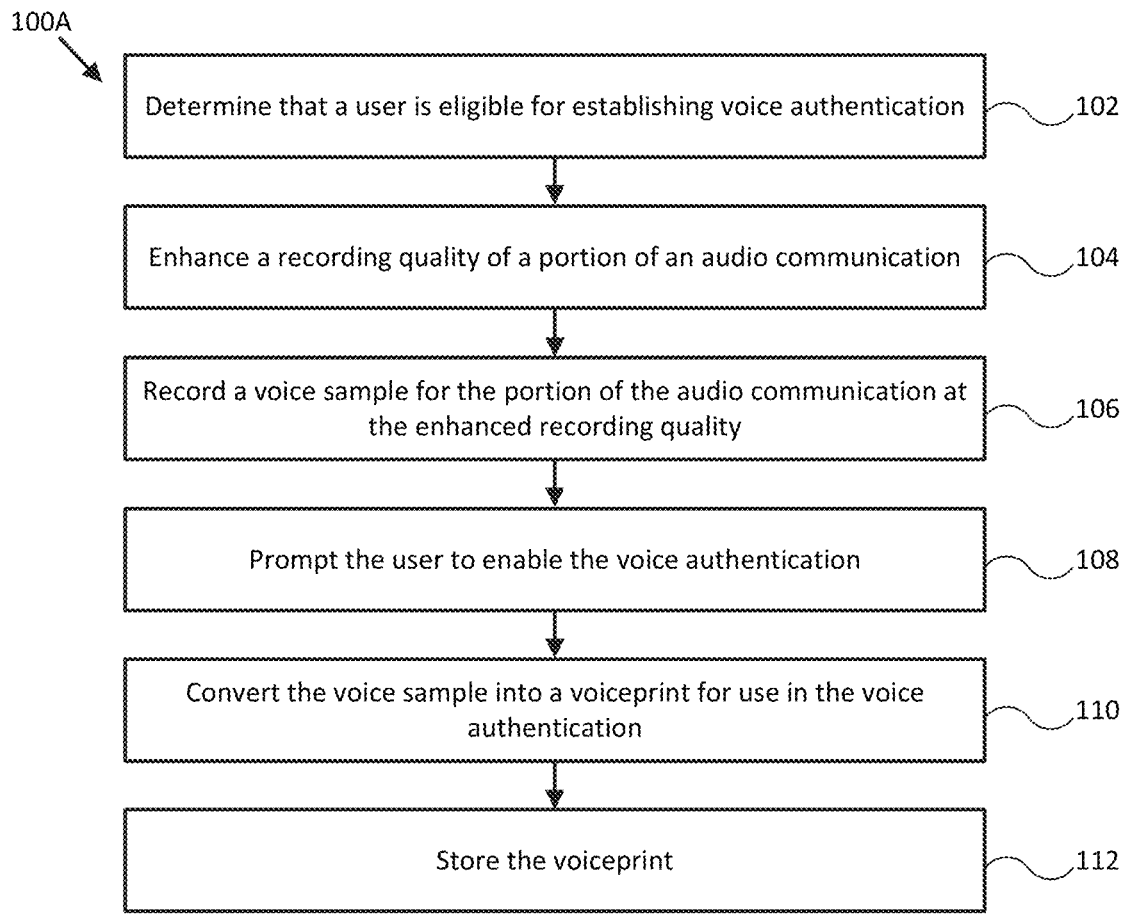
FIG. 1A illustrates a flow diagram of a process for enabling a voice authentication capability for a user account in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In today's world, users have come to expect fast, seamless, and secure experiences when they contact a service center system (e.g., an interactive voice response system). A user may have to identify himself/herself through an authentication process when contacting the service center system so that the service center system can better serve the user. However, authenticating users using traditional passwords or personal information security questions is slow, wearying for users, and susceptible to exploitation. For example, users oftentimes cannot remember passwords or security question answers. Thus, more time than desired ends up being devoted to identity authentication during calls to the service center system. Moreover, traditional passwords and security question answers can be stolen by bad actors who may use the same to perform account takeovers or otherwise fraudulently access user accounts. Device-centric authentication techniques do not offer better solutions as they are oftentimes unreliable, inflexible, and can be spoofed. For example, phone numbers can be stolen and/or cloned. Both approaches create poor user experiences and enable fraud. Thus, there exists a need in the art for streamlined user authentication techniques that offer better computer security.

The present disclosure provides systems and methods for voice authentication that allow a computer system to non-intrusively collect voice data for a user such that a user experience during a call is not interrupted. The collected voice data may be used for several purposes including enrolling the user into a voice authentication capability for his/her user account and authenticating the user using voice biometrics when the user calls into the service center system.

For example, in one embodiment, a computer system may perform various operations related to enrolling a user into a voice authentication capability for his/her user account. When a user calls into a service center communication system, the service center communication system may establish a real-time audio communication with the user's device (e.g., mobile phone). The computer system, which may be communicatively coupled to the service center communication system, may determine that the user is eligible for establishing a voice authentication capability for his/her user account. If the user is eligible, the computer system may enhance a recording quality for a portion of the real-time audio communication to record a voice sample of the user, which may be later used to generate a voiceprint for the voice authentication capability. In some cases, the enhanced recording may be a step-up in recording quality from a standard recording of the call that would be used for training and related purposes (e.g., customer service, quality assurance, etc.). The enhanced quality may filter out background noise to focus on high-definition voice characteristics of the user's speech. The enhanced quality recording containing the voice sample may be stored in a raw audio repository pending conversion to a voiceprint. In various embodiments, the enhanced quality recording may be minimally intrusive and performed during a normal conversation between the user and an agent in the real-time audio communication such that the user's natural voice can be captured. For example, the user's responses to questions related to the user's reason for calling the service center communication system may be used to capture the voice sample.

The computer system may send a prompt to the user device (e.g., delivered to the user via a mobile app PUSH notification, SMS, or email), such as after the call disconnects, to ask whether the user would like to enroll in the voice authentication capability for his/her user account. The non-intrusive nature of this enrollment experience may relieve any manual efforts in enrolling the user, thus reducing an overall duration of the interaction for a call and providing a cost-efficient solution. The voice authentication capability may be used for several purposes such as enabling the user to authenticate himself/herself using the voice authentication capability during the next time that the user contacts the service center communication system. If the user chooses to enroll in the voice authentication capability, the computer system may generate a voiceprint for the user account based on the captured voice sample and enable the voice authentication capability for the user account.

During the next time that the user calls to the service center communication system, the computer system may identify the user account using a validated caller identifier (ID) for the user device and authenticate the user by comparing a voice sample of the user captured during the call to the voiceprint for the user account. Similar to how the voice sample was captured during enrollment in the voice authentication capability, when the user calls after enrolling in the voice authentication capability, the user may be authenticated by his/her voice during normal conversation in the call. Thus, the voice authentication capability may be minimally or non-intrusive for the user. Also, by enhancing recording quality only when the voice sample is being obtained, computing resource and power usage is reduced compared to maintaining the enhanced recorded quality throughout the call. Further details and additional embodiments are described below in reference to the accompanying figures.

Figure 1B:
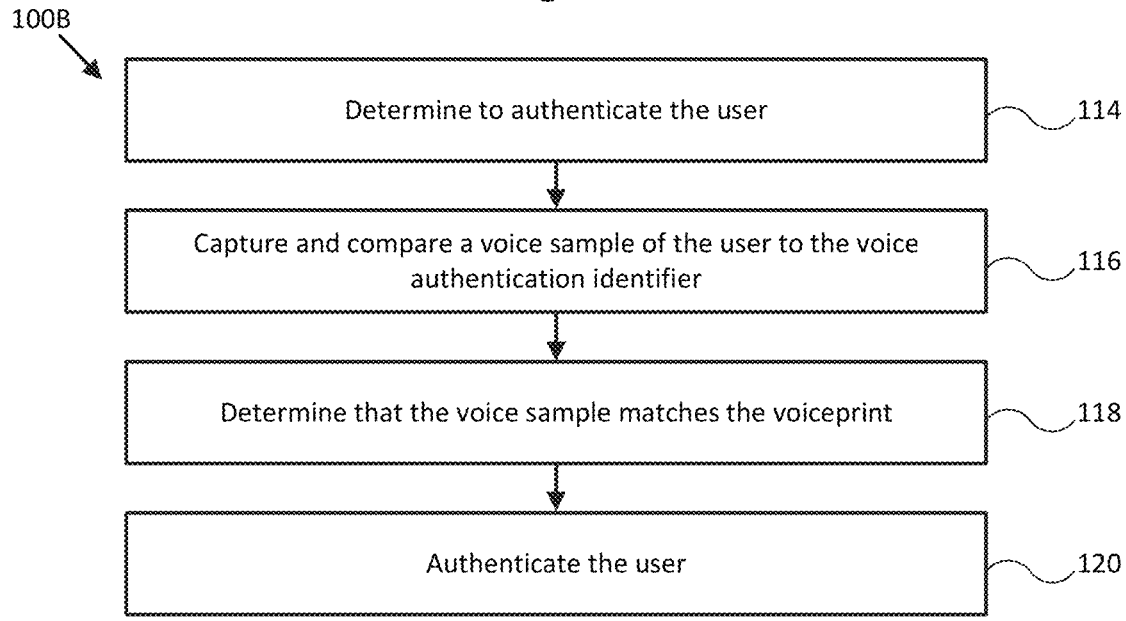
FIG. 1B illustrates a flow diagram of a process for authenticating a user using voice authentication in accordance with one or more embodiments of the present disclosure.

FIG. 1A illustrates a flow diagram of a process 100A for establishing voice authentication capabilities in accordance with one or more embodiments of the present disclosure. FIG. 1B illustrates a flow diagram for a process 100B for authenticating a user through voice authentication in accordance with one or more embodiments of the present disclosure. The blocks of processes 100A and 100B are described as occurring in serial or linearly (e.g., one after another). However, multiple blocks of processes 100A and 100B may occur in parallel. In addition, the blocks of processes 100A and 100B need not be performed in the order shown and/or one or more of the blocks of processes 100A and 100B need not be performed. For explanatory purposes, processes 100A and 100B are primarily described herein with reference to FIGS. 2-5 but their descriptions may generally be applied to the additional figures of the disclosure.

It will be appreciated that first, second, third, etc. may generally be used as identifiers herein for explanatory purposes and are not necessarily intended to imply an ordering, sequence, or temporal aspect as can be appreciated from the context within which first, second, third, etc. may be used.

In some embodiments, the processes 100A and 100B may be performed by a computer system having at least a non-transitory memory (e.g., a machine-readable medium) and one or more hardware processors configured to read/execute instructions stored in the non-transitory memory to cause the computer system to perform operations in the processes 100A and 100B. For example, the computer system may be, may include, or may be part of the computer system architecture 600 of FIG. 6 and/or the computer system 800 of FIG. 8.

Figure 2:
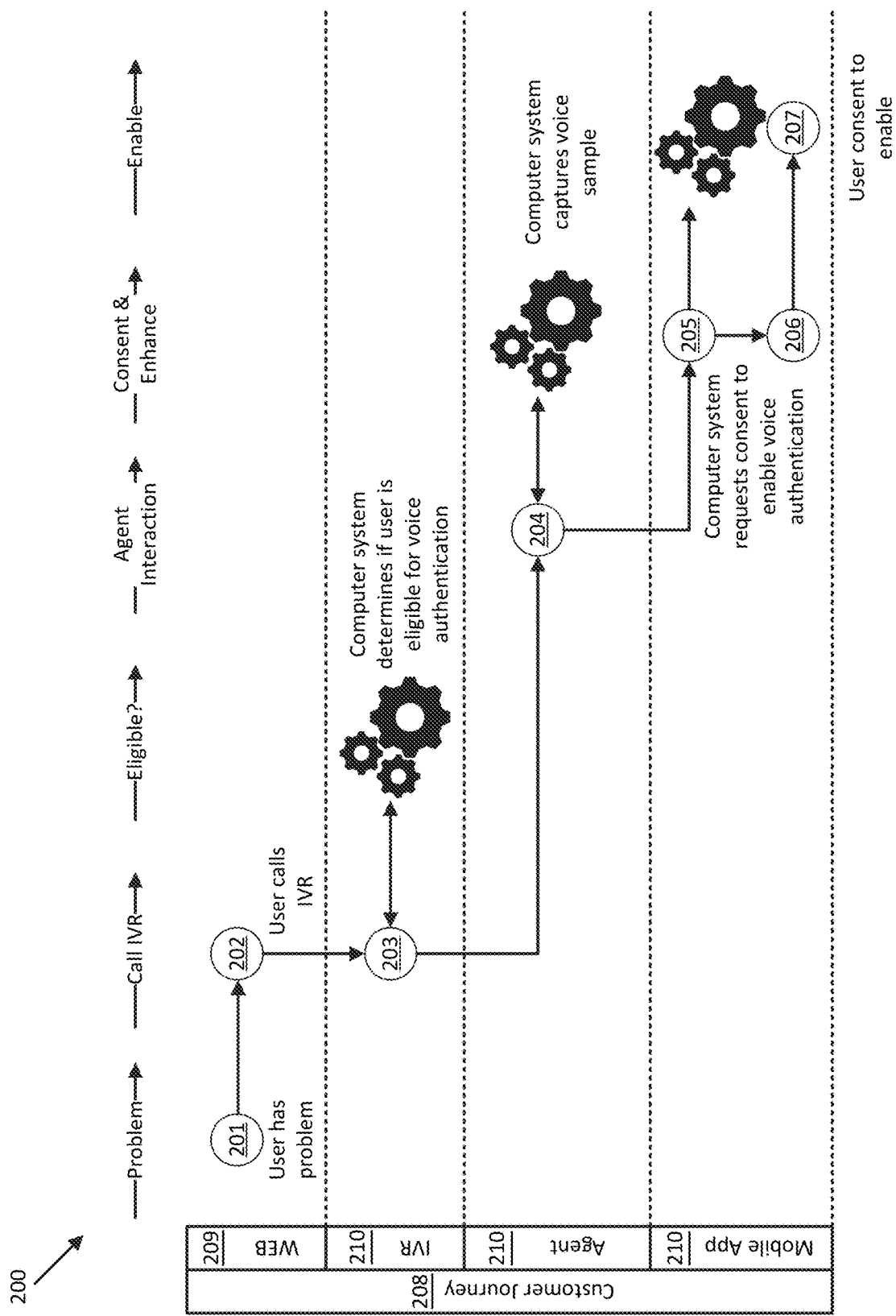
FIG. 2 illustrates an example customer journey in which silent offline enrollment for a voice authentication capability may be performed in accordance with one or more embodiments of the present disclosure.

For context, reference is made to FIG. 2, which shows steps that a user may take in a customer journey 208. At step 201 in the customer journey 208, the user may be interacting with a web service 209 (e.g., an electronic service) provided by an electronic service provider. For example, the web service 209 may be provided by the electronic service provider over the Internet to a user device associated with the user via a web browser or other application (e.g., a mobile application provided by the electronic service provider). In some cases, the user may have a registered user account with the electronic service provider. The user may encounter a problem associated with the web service 209 at step 201 in the customer journey 208. For example, the problem may be a technical problem with the web service 209, a question that arises when using the web service 209, a question regarding the user's account for use of the web service 209, and so forth.

At step 202 in the customer journey 208, the user may communicate with (e.g., call via telephone) an interactive voice response (IVR) system 210 managed by the electronic service provider. For example, the user may make a telephone call to the electronic service provider, which may be routed to a communication with the IVR system 210. In some embodiments, the IVR system 210 may be a service center communication system that is part of, or communicatively coupled to, the computer system and operable to send and receive telecommunications to and from end user devices, such as via a mobile phone network, a public-switch network, an IP based network or a combination thereof. The IVR system 210 may receive the communication from the user device associated with the user and establish/activate a real-time audio communication with the user device at step 203 in the customer journey 208. In some cases, the IVR system 210 may be managed by the electronic service provider with whom the user has a registered user account. Thus, the IVR system 210 may be able to identify the user account associated with the user based on a user device ID corresponding to the user device in communication with the IVR system 210 (e.g., a telephone number, user account identifier, user handle, etc.).

Referring back to FIG. 1, at block 102, the computer system may determine that the user is eligible for establishing a voice authentication capability for the user account. In some embodiments, the computer system may determine that the user is eligible for establishing the voice authentication capability by collecting a profile for the user account from a user account database. Based on the profile, the computer system may determine that the user account is eligible if the user account has not yet established a voice authentication capability, has not disabled the voice authentication capability for the user account, and/or has not opted out of enrolling in the voice authentication capability. In some cases, the computer system may determine that the user is eligible based on the user having downloaded a mobile application 210 to the user device, which may be provided and serviced by the electronic service provider.

In some embodiments, the computer system may determine that the user is eligible for establishing the voice authentication based on a geolocation corresponding to the user device. For example, during the audio communication with the user device, the computer system may request a geolocation from the user device associated with the user account or may retrieve a user-inputted profile location for the user account. The computer system may determine that the geolocation or profile location are within a geofence associated with eligibility for establishing the voice authentication capability, such as allowed under regulations for the location.

For example, where the voice authentication capability is rolled out in phases according to geofences set by the electronic service provider, users who are located within the geofence corresponding to the current rollout phase may be eligible for establishing voice authentication capability.

In further embodiments, the electronic service provider may have other metric(s) that are used as a basis for the computer system to determine which users are eligible for a rollout of the voice authentication capability. For example, the computer system may group the users into prioritized groups that receive the option to enroll in the voice authentication capability in a cascading manner until each group has had an eligibility period where users of said group can enroll in the voice authentication capability, such as by calling to the IVR system 210 to establish the voice authentication capability for their user account. By performing a phased rollout, network traffic may be evenly distributed over a period of time to prevent overburdensome reductions to computer processing bandwidth caused by heavy network data traffic during voice authentication enrollments. In some embodiments, the users may be prioritized in the groups based on electronic service usage. For example, users who heavily use the electronic services provided by the electronic service provider may be placed in higher priority groups than users who lightly use the electronic services.

In some embodiments, the computer system may determine that the user is eligible for establishing the voice authentication based on a frequency by which the user device has telecommunicated with the IVR system 210. For example, if the user is a frequent caller to the IVR system 210, it may be more efficient to establish the voice authentication capability for the user to reduce friction in the user experience, such as by avoiding time spent on authenticating the user through traditional methods such as having a human operator ask security questions which require the user to remember answers from account setup.

In other words, when the user calls into the IVR system 210, instead of having the user authenticate through more laborious ways such as entering a PIN or security question answers (e.g., date of birth, social security number, mother's maiden name, etc.), the user may simply authenticate himself/herself using voice authentication. According to various embodiments, the computer system may determine the frequency of calls for the user meets a threshold indicating that the user qualifies as a frequent caller. For example, a threshold may be a certain number of calls over a period of time made to the IVR system 210 (e.g., five calls over the past week).

Referring again to FIG. 2, the user may be at step 204 in the customer journey 208 in which an agent 210 engages with the user in real-time audio communication between the IVR system 210 and the user device. In some embodiments, the agent 210 may be a virtual assistant system that is part of the IVR system 210 and is operable to interact with the user to obtain various items of information and/or direct the user to a solution to his/her problem (e.g., frequently asked questions and answers, automated interactions such as account information retrieval, billing information, etc.). In some cases, the agent 210 may be a human operator who may assist the user in solving his/her problem.

In some embodiments, the computer system may record the real-time audio communication between the IVR system 210 and the user device. The recorded audio communication may be used for training, customer satisfaction, and other related purposes for the electronic service provider. In some embodiments, the agent 210 may provide audio commands to the user to answer questions related to the user's reason for calling to the IVR system 210 to facilitate directing the user to an appropriate response. In some cases, the interaction between the agent 210 and the user may be typical of a normal conversational (e.g., non-authenticating specific conversation).

Referring back to FIG. 1, at block 104, the computer system may enhance a recording quality for a portion of the audio communication between the IVR system 210 and the user device. For example, during the interactions with the agent 210, the computer system may record audio responses provided by the user at an enhanced recording quality to capture a voice sample that can be used for generation of a voiceprint. The voiceprint may be used as a reference for comparison in future voice authentications of the user to determine if there is a match. In some cases, the enhanced recording quality may be a step-up in quality (e.g., high definition) compared to the standard recording quality that may be used for training and other purposes. For example, in some cases the computer system may filter the recording to reduce background noise (e.g., non-essential background sound other than user's speech input), so that the background noise does not interfere with the generation of the voiceprint. Traditionally, regular voice recordings collected for training purposes are heavily compressed for efficiency in storing the recorded voice data as a contact center may handle a large number (e.g., millions) of calls. The enhancement (e.g., step up) in voice recording quality for voice biometric authentication may be non-compressed audio that preserves all the aspects of the raw audio, while cutting out background noise, which may allow for generation of a high-quality voiceprint that may be used for voice authentication later during subsequent contacts. In some embodiments, the eligibility nudge/trigger event may be used to silently record high quality voice audio for a duration that suffices in generation of a high-quality voiceprint. Once a sufficient duration has been recorded for voiceprint generation, the voice recording can fall back to standard compressed audio recording (e.g., regular voice recordings). Such dynamic decisioning and interleaving of high-quality voice recording provides an improvement over standard call recording technology. In some embodiments, storage of such recordings can be organized in separate databases and/or as a combined record in which case a start marker and end marker can help delineate the two different quality portions in the voice record, as further discussed herein.

At block 106, the computer system may record a voice sample for the portion of the audio communication that is being recorded at the enhanced recording quality. The computer system may analyze the voice sample, which may include more than one instance of speech input provided by the user during the enhanced quality recording, to determine if a sufficient voice sample has been captured to generate a voiceprint of the user based on unique information about the user's vocal tract and the behavior of the user's speaking patterns. In some embodiments, the computer system may continue to record the audio communication at the enhanced recording quality until the computer system has determined that a sufficient amount data from audio responses provided by the user has been captured to generate the voiceprint. For example, the computer system may instruct the agent 210 to ask several questions to the user so that the computer system may capture a number of different voice responses provided by the user until the sufficient data for the voice sample is captured and useable to generate the voiceprint.

In some embodiments, the voiceprint may be a language-independent voiceprint whereby the user can be authenticated based on their voice regardless of any passphrase. In other embodiments, the user may be requested to speak a passphrase that can be used in the generation of the voiceprint such that authentication can be based on the user's voice along with a secret passphrase known by the user.

In some embodiments, the computer system may split the enhanced quality recording containing the voice sample into a first electronic file separate from the standard recording of the audio communication saved as a second electronic file. Splitting the voice sample into a separate file from the standard recording of the audio communication may allow for disparate treatment of the files. For example, the standard recording of the audio communication or the voice sample may be separately deleted according to different triggering events. For example, the file for the standard recording of the audio communication may be deleted after a certain period of time. As another non-limiting example, in some cases, the voice sample may be deleted if user consent is not obtained, while the standard recording of the audio communication may be deleted according to a different timeline. In some implementations, the computer system may temporarily store the split enhanced quality recording in a raw audio repository (e.g., in a database) pending a user consent from the user to enable the voice authentication capability for the user account.

In other embodiments, the enhanced quality recording may be part of the same electronic file for the standard recording of the audio communication. For example, time stamps or time markers may be used to indicate an audio segment in the standard recording electronic file where the enhanced quality recording segment may be located. The computer system may later reference the time stamps to extract the voice sample for use in generating the voiceprint, such as after receiving the user consent to enroll in the voice authentication capability.

In some cases, the enhanced quality recording may be performed in the background of the real-time audio communication such that a voice sample of the user can be captured in a non-intrusive way that does not disrupt a normal conversation occurring in the real-time audio communication. In other words, the non-intrusive enhanced quality recording may be performed in a manner such that the user does not have to take any additional actions beyond a normal conversation between the agent 210 and the user, such being instructed to speak phrases specifically for the voice sample and setting up the voice authentication capability. However, in other embodiments, the agent 210 may activate the enhanced quality recording and may audibly instruct the user during the audio communication to provide speech input that can be used to generate a voiceprint for setting up the voice authentication capability. In certain embodiments, the agent 210 may instruct the user to say certain phrases to help create the voiceprint, such as phrases that would provide sufficient voice characteristics to generate the voiceprint. For example, the phrases may cause the user to use certain vocal ranges that may provide more vocal data for generation of the voiceprint.

In another embodiment, the system does not start the enhanced quality recording until it detects a reduced level of background noise. For example, if the system detects background noise above a certain threshold or a voice-to-background noise ratio below a certain threshold, the system may delay enhancing the voice recording until the background noise falls below the threshold or when the ratio rises above the threshold. In some embodiments, the threshold may be predefined based on a minimally sufficient recording environment such that the voice sample that is captured is as noiseless as possible. In some cases, a user may have to move from a noisy background environment to a less noisy background in order to achieve the desired conditions to provide the voice sample. In some cases, the agent 210 may instruct the user to move to less noisy locations until a measured decibel reading from background noise falls below a threshold. In some embodiments, the computer system may implement low-pass, high-pass, and/or band-pass filters to remove background noise that is not conducive to capturing the voice sample from the user.

At block 108, the computer system may prompt the user to enable the voice authentication capability for the user account. For example, referring again to FIG. 2, the user may be at step 205 in the customer journey 208, wherein the computer system may send a request to the user device to obtain a user consent to enable the voice authentication capability for the user account.

Figure 3:
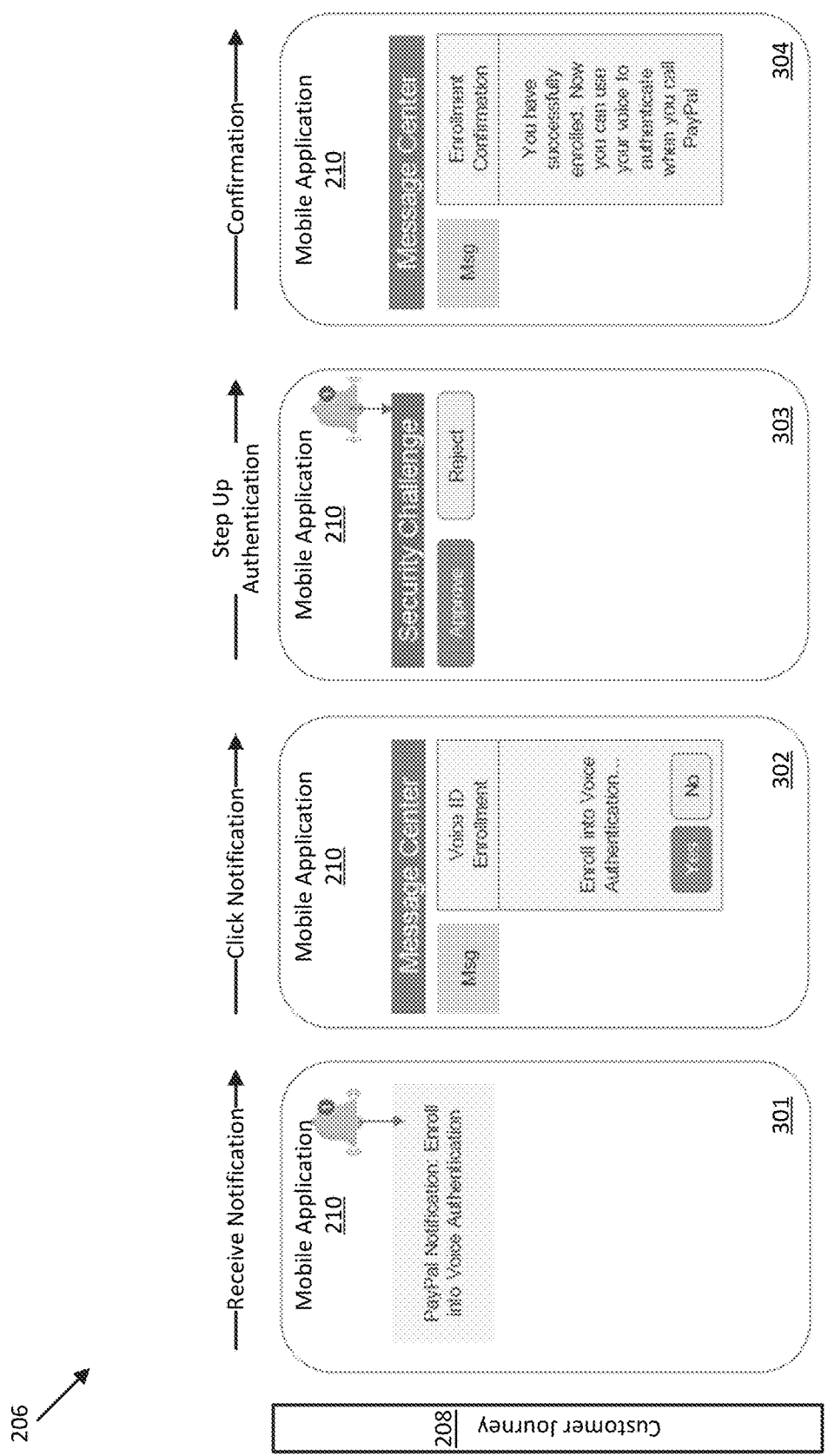
FIGS. 3-4 illustrate example voice authentication enrollment user interface flows in accordance with embodiments of the present disclosure.

For example, referring to FIG. 3, the computer system may cause a notification 301 to display in a mobile application 210 of the user device. The notification 301 may correspond to a request to enable the voice authentication capability. At step 206 in the customer journey 208, the user may open the notification 301 and be brought to a user interface screen 302 in which the user may review the message associated with the notification 301. The message may include a prompt that has selectable options for a user to respond. For example, the user may respond by enabling the voice authentication capability, declining to enable the voice authentication capability, or ignoring the message to enable the voice authentication capability (e.g., period of time to respond lapses).

In one case, at step 206 of FIG. 2, the user may choose to enable the voice authentication capability. When the user selects to enable the voice authentication capability, the computer system may cause the mobile application 210 to execute a security challenge 303 for the user, which must be solved by the user to authorize the enablement of the voice authentication capability, as shown in FIG. 3. In some embodiments, the security challenge 303 may include entering a PIN or password for the user account and/or correctly answering a security question for the user account to authorize enabling the voice authentication capability. In some cases, the computer system may send a request to the operating system of the user device to perform a separate biometric authentication as part of the security challenge 303. For example, the computer system may request a verification from the operating system that the user has satisfied a biometric authentication corresponding to access to the user device (e.g., facial scan, fingerprint scan, voice command, etc.). In other cases, the security challenge 303 may include a one-time password entry. For example, the computer system may send a one-time password to a telephone number associated with the user account, which can be inputted for the security challenge 303 to authenticate the user and authorize enablement of the voice authentication capability.

Once the user has completed the security challenge 303, according to some embodiments, the computer system may send a confirmation 304 to the mobile application 210 for display in the user device and to indicate that the user has successfully enabled the voice authentication capability.

Figure 4:
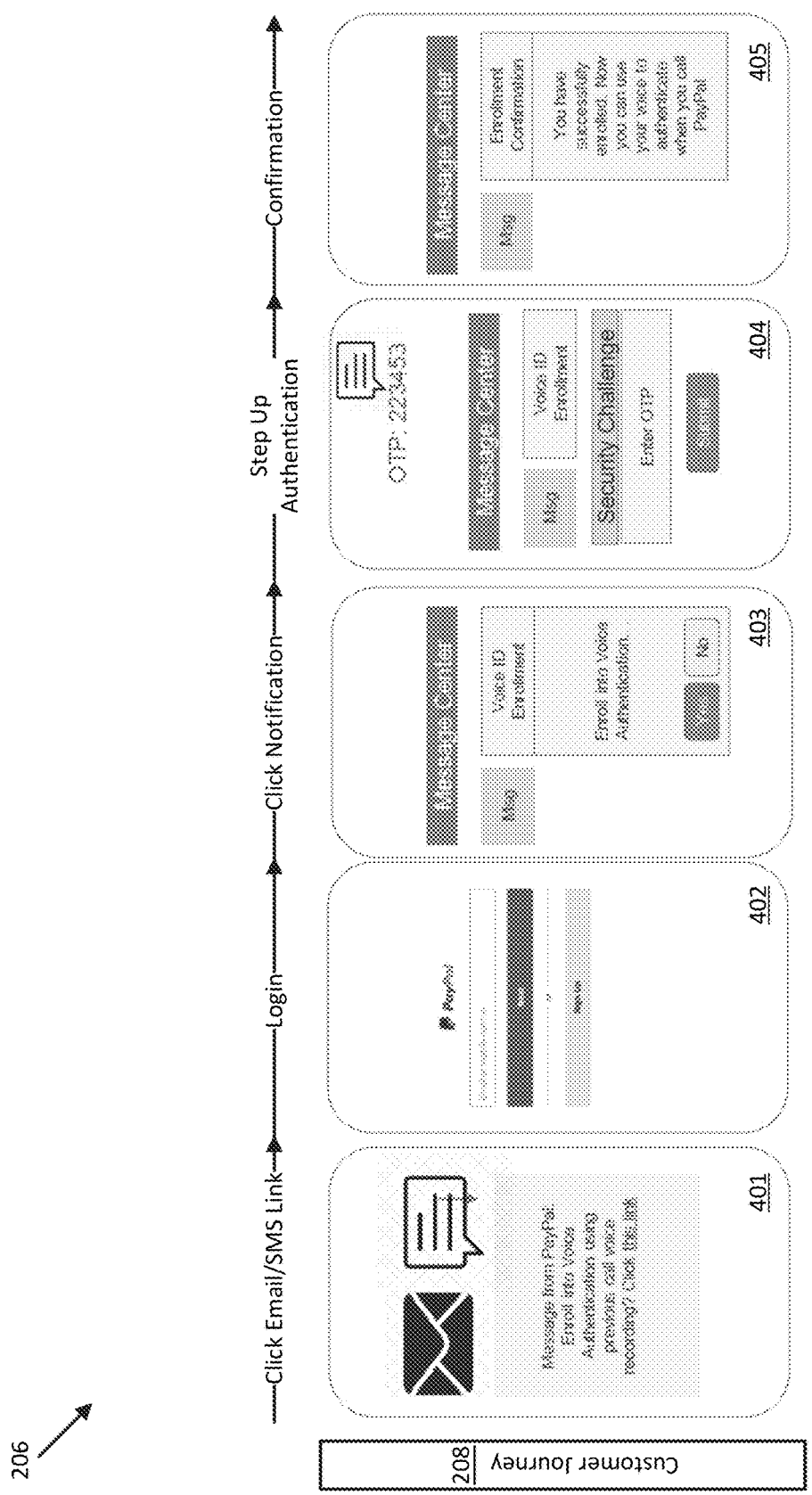

In another embodiment, if the computer system determines that the user account does not have the appropriate mobile application 210 downloaded and installed on the user's device, the computer system may send a notification 401 for step 205 of FIG. 2 via an email or text message notification as shown in FIG. 4. Where the notification 401 is an email, the email may be received by the user device and presented in an email client. Where the notification 401 is a text message, the text message may be received by the user device and presented in a text messaging application installed on the user device. The email or text message notification 401 may include a clickable link which may direct the user to a web application where the user may log in 402 to his/her user account to view a message 403 in a message center. The message 403 may contain a prompt for the user to enable the voice authentication capability for the user account. If the user chooses to enable the voice authentication at step 206 of FIG. 2, the user may send a positive response to the message 403. In some embodiments, the computer system may request that the user solve a security challenge 404 after receiving the positive user consent response. The security challenge 404 may be similar to the security challenge 303. Once the user has responded to enroll in the voice authentication capability, the computer system may send a confirmation notification 405 to the user account indicating that the user has successfully enrolled in the voice authentication capability.

Referring back to FIG. 1, at block 110, the computer system may convert the voice sample of the user into a voiceprint for use in the voice authentication capability. In some embodiments, the computer system may convert the voice sample of the user into the voiceprint after receiving the user consent to enable the voice authentication capability. The computer system may access and retrieve the voice sample stored in the raw audio repository. In embodiments where the voice sample is marked by time stamps in an audio file (e.g., provided by metadata of the audio file), the computer system may extract the enhanced quality recording of the voice sample from the audio file using time stamps indicating segment(s) in the audio file where the voice sample is contained.

Converting the voice sample into the voice print may include generating the voice print based on the voice sample according to various implementations. For example, statistical models of the characteristics of spectral features present in a user's pronunciation of various phonemes can be implemented to distinguish voice characteristics of the user's voice. For example, Vector Quantization codebook-based techniques may be employed by the computer system to generate a voiceprint. Ergodic-HMM based methods that analyze the stochastic Marchovian transitions between states to build learned models of voice characteristics such as voicing, silence, stop burst, nasal/liquid, frication, etc., may be used to generate the voiceprint according to some embodiments. Various other techniques may be used to generate the voiceprint as would be understood by one of skill in the art.

It will be appreciated that the voiceprint may be passphrase-independent, which may allow for voice authentication without requiring a specific passphrase or particular word be spoken for voice authentication. However, in some implementations, the voiceprint may be used in conjunction with passphrases to further increase authentication security by adding a separate challenge response authentication step. In other words, a user may be required to have a voice match and correctly answer a security question in order to be authenticated according to some embodiments.

At block 112, the generated voiceprint may be stored by the computer system in an accessible biometric repository (e.g., a database). The voiceprint may be linked to the user account such that a next time when the user calls into the IVR system 210, the voiceprint can be referenced for comparison by the computer system when performing voice authentication for the user.

Referring to FIG. 1B, the process 100B for authenticating the user using voice authentication will now be described. At block 114, the computer system may determine to authenticate the user. For example, referring to FIG. 5, the user may be at step 501 of the customer journey 500 in which the user has encountered a problem when using the electronic services provided by the electronic service provider. Thus, at step 502, the user may call the electronic service provider, which may route to a communication with the IVR system 210, to resolve his/her problem. In some embodiments, the computer system may identify a user account based on the phone number from which the user is calling the IVR system 210. In some cases, the computer system may identify a user account for the user based on a user account from which the call originated, for example, such as when the user makes an in-app call to the IVR system 210 while logged into a mobile application or web application provided by the electronic service provider.

At step 503 in the customer journey 500, once the user account has been identified, the computer system may determine whether the user account has enabled the voice authentication capability. At step 504 in the customer journey 500, if the user account has the voice authentication capability enabled, the computer system may determine that the user can be authenticated using the voice authentication capability.

Referring again to FIG. 1B, at block 116, the computer system may capture a voice sample from the user during interactions with the IVR system 210 and compare the voice sample of the user to the voiceprint stored in association with the user account. In some embodiments, authenticating the user may be performed passively. For example, authentication of the user may be performed while the user is interacting with the IVR system 210 or an agent in non-authentication-specific ways. In other words, the voice sample may be captured non-intrusively in normal conversation between an agent for the IVR system 210 and the user (e.g., capturing voice responses to non-authentication specific questions). In other cases, the agent may provide instructions for the user to speak certain phrases for voice authentication purposes.

The voice sample to be authenticated may be saved and compared to voice characteristics of the voiceprint for the user account so as to output an authentication score. In one embodiment, the authentication score may be computed by the computer system by performing an acoustic analysis of the voice sample to produce a sequence of acoustic vectors representing the relevant voice characteristics for statistical analysis and comparison. Statistical pattern matching algorithms may be used in some cases to compare the sequence of acoustic vectors with the voiceprint to generate the authentication score, which may represent how well the voice sample matches the voiceprint for the user account (e.g., an indication of the likelihood that the user who provided the original voice sample used to generate the voiceprint and the user who provided the current voice sample for authentication are one in the same). Such pattern matching algorithms may include dynamic time warping, the hidden Markov model, and other algorithms known by those skilled in the art. In some cases, a two-pass speaker recognition approach may be used that first explicitly determines phonemes or phoneme classes from audio data of the voice sample and then performs speaker verification by a weighted combination of matches for each recognized phoneme category.

At block 118, the computer system may determine that the voice sample matches the voiceprint. For example, the computer system may determine that the authentication score discussed above may meet a threshold indicating that the voice sample matches (e.g., is sufficiently similar to) the voiceprint. In some embodiments, if no match can be determined, the computer system may request the user to repeat a phrase or the voice sample a certain number of times (e.g., three) before determining voice authentication has failed. This may be useful if the user is in a noisy environment and then moves to a quieter location or speaks more clearly into the device. In other embodiments, if no match can be determined, the computer system may record that voice authentication has failed and the user may be subjected to fallback challenges such as passwords or PINs. In some embodiments, multiple failures may lead to a security lock being placed on the user account, which may require investigation (e.g., automatic or manual) to detect possible fraudulent activity on the user account. The conclusion of the investigation and confirmation by the user account holder may be used to unlock the voiceprint and user account use.

At block 120, the computer system may authenticate the user. For example, responsive to the authentication score meeting the threshold indicating that the voice sample matches the voiceprint, the computer system may authenticate the user for further interaction with the IVR system 210. Thus, the interactive audio communication with the IVR system 210 may adjust to allow for user account details to be shared with the user at step 505 of the customer journey 500.

Figure 5:
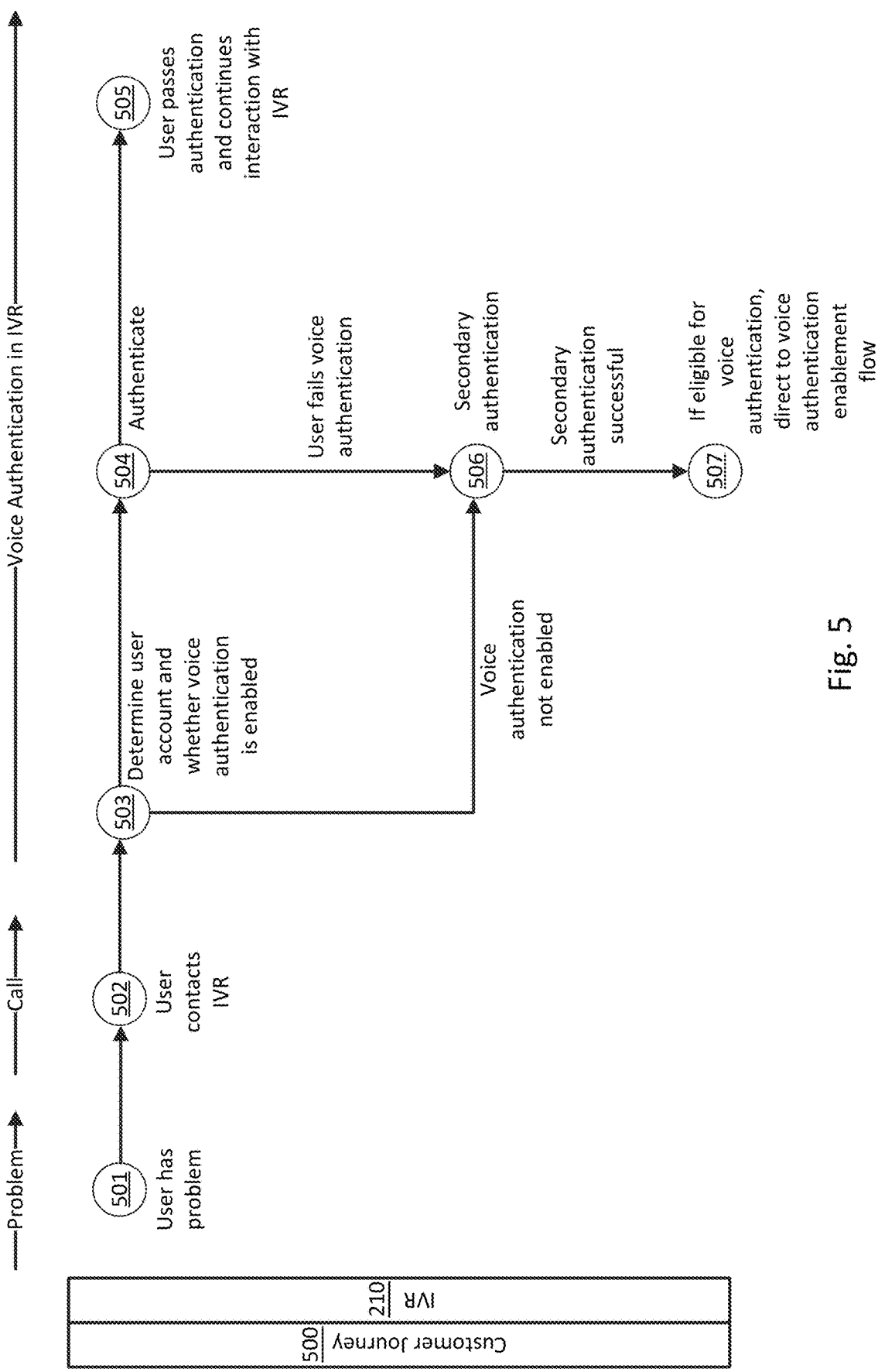
FIG. 5 illustrates an example customer journey in which a user may use voice authentication in accordance with one or more embodiments of the present disclosure.

As shown in FIG. 5, in some embodiments, the user may not have the voice authentication capability enabled for the user account or may fail the voice authentication at step 504. In such cases, the user may proceed to step 506 of the customer journey 500 where secondary authentication is performed by the computer system. For step 506, the computer system may request from the user to input a PIN, such as a four-digit number (e.g., last four digits of social security number, date of birth, one-time password sent to phone number associated with user account, etc.) to authenticate and/or answer a security question that would be known by the account holder.

After successful secondary authentication, the user may proceed to step 507, which may include one or more operations from process 100A for establishing or re-establishing the voice authentication capability for the user account.

Figure 6:
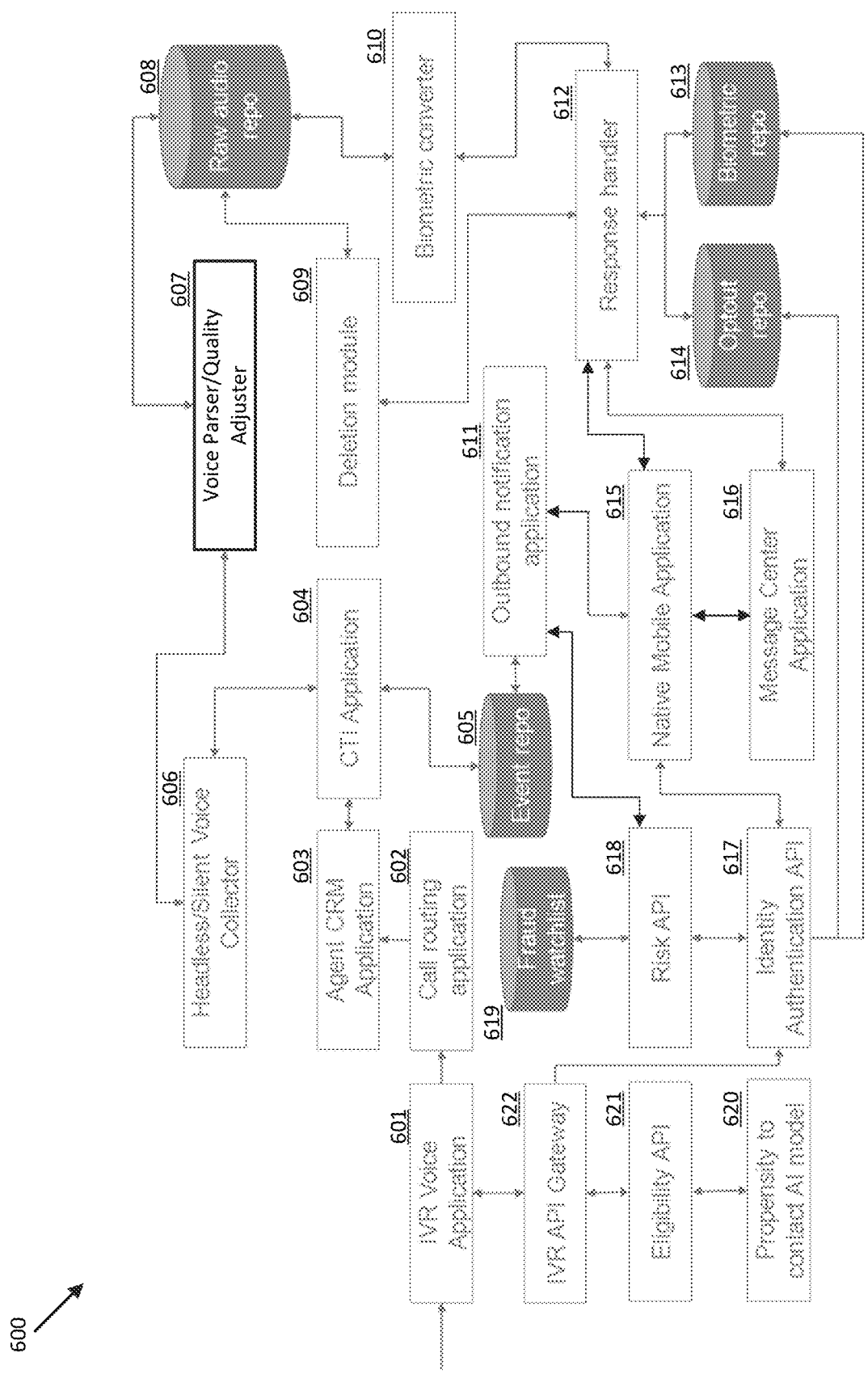
FIG. 6 illustrates a computer system architecture suitable for implementing one or more embodiments of the present disclosure.

FIG. 6 illustrates a computer system architecture 600 configured to integrate a dual recording system whereby a quality adjustment in a standard quality recording can be enhanced for capturing voice samples as part of voice authentication enrollment and utilization process in accordance with one or more embodiments of the present disclosure. The components 601-622 of the computer system architecture 600 may be implemented using hardware, software, or combinations of hardware and software. Where applicable, one or more of the components 601-622 of the computer system architecture 600 may be combined into composite components comprising software, hardware, and/or both. Where applicable, one or more of the components 601-622 may be separated into sub-components comprising software, hardware, or both. In addition, where applicable, it is contemplated that software components may be implemented as hardware components and vice-versa. One or more of the components 601-622 may include machine-readable program code and/or data, which may be stored on one or more computer readable mediums and may be executable to cause the component to perform certain operations described herein.

When a user calls an electronic service provider, an IVR voice application 601 may accept the incoming call. The IVR voice application 601 may be implemented with self-service features to assist the user. For example, the IVR voice application 601 may be able to answer questions regarding the user's account information (e.g., billing, etc.) and general information requested about the electronic service provider (e.g., hours, contact information, etc.). The IVR voice application 601 may be able to identify the user's account based on the telephone number of the incoming call. For example, the IVR voice application 601 may communicate with the IVR API gateway 622 to query for the account corresponding to the telephone number.

The IVR voice application 601 may further communicate with the IVR API gateway 622 to request information from the eligibility API 621. The eligibility API 621 may be used to determine whether the user who called is eligible for voice authentication enrollment as discussed in the present disclosure. In an embodiment, the eligibility API 621 may communicate with the propensity-to-contact artificial intelligence (AI) model 620 to determine whether the user is eligible for the voice authentication enrollment. For example, the propensity-to-contact AI model 620 may predict a likelihood score that the user will be a repeat caller based on a frequency that the user has called the electronic service provider and/or other user account information.

If the user is determined to be eligible for voice authentication enrollment, the IVR voice application 601 may pass the eligibility information to the call routing application 602, which may pass the eligibility information to the agent customer relationship management (CRM) application 603 when the call routing application 602 transfers the call to the agent CRM application 603, such as when the user requests to speak to an agent for the electronic service provider. The agent CRM application 603 may further pass the eligibility information to the computer telephony integration (CTI) application 604, which may record such information in the event repository 605. The event repository 605 may record events that transpire during the call.

The CTI application 604 may orchestrate the call by enabling phone functions to be controlled and managed by computer programs. The CTI application 604 may instruct the headless/silent voice collector 606 to record the call when the user speaks with an agent controlling the agent CRM application 603, such as for quality assurance and training purposes. The CTI application 604 may also instruct the headless/silent voice collector 606 to enhance the recording quality of the call in response to the user being eligible for voice authentication enrollment as discussed in the present disclosure.

The headless/silent voice collector 606 may instruct the voice parser/quality adjuster 607 to enhance the recording quality to a higher specification than the standard recording of the call to capture a voice sample of the user. In some embodiments, the call may be recorded at the enhanced quality until sufficient voice data has been captured to generate a voice print (e.g., a threshold duration of time and/or user speech). In some embodiments, the call may be recorded at the enhanced quality until the call disconnects. In other embodiments, once sufficient voice data has been captured for the voice sample, the voice parser/quality adjuster 607 may reduce the recording quality back to a standard recording quality so that computer storage resources can be preserved when audio files are saved as the enhanced recording quality may require more data. In some embodiments, the voice parser/quality adjuster 607 may split out the voice sample recording and save the voice sample recording to the raw audio repository 608. In other embodiments, the voice parser/quality adjuster 607 may mark start and end instances in the voice sample recording indicating a segment of a call recording where the user's speech was captured at the enhanced quality for use as a voice sample, and may store the call recording as a file that can later be used to extract the voice sample. For example, batch processing may be implemented such that, at batch intervals, call recordings can be parsed to extract voice samples for storage in the raw audio repository 608 or conversion to voiceprints by biometric converter 610 and storage in biometric repository 613.

After the call disconnects, the CTI application 604 may record the disconnect event in the event repository 605. If the user is eligible for voice authentication enrollment, the disconnect event may trigger an outbound notification application 611, which monitors the activity recorded to the event repository 605, to send a push notification to a native mobile application 615 for the user. The native mobile application 615 may display the notification in a user account interface presented in a user device. The push notification may direct the user to a message managed by the message center application 616. The message may include a prompt that asks the user if he/she would like to enable voice authentication capability for his/her user account.

A user's response to the message may be passed to a response handler 612. If the user responds that he/she would like to enable the voice authentication capability, the response handler 612 may instruct a biometric converter 610 to retrieve the voice sample from the raw audio repository 608 and convert the voice sample into a voiceprint as discussed herein. The biometric converter 610 may generate the voiceprint and provide the voiceprint to the response handler 612 so that the response handler 612 may store the voiceprint in the biometric repository 613. In some cases, before converting the voice sample to the voiceprint, the message center application 616 may provide the user's response to the outbound notification application 611 through the native mobile application 615. The outbound notification application 611 may communicate with the risk API 618 to request a one-time password that the outbound notification application 611 can send to the user device (e.g., via email or text message) as a security challenge to be solved before the user can enroll in the voice authentication capability. When the user provides the one-time password to solve the security challenge, the message center application 616 may provide the response to enable the voice authentication capability to the response handler 612 as described above.

If the user responds that he/she does not want to enable the voice authentication capability, or ignores the message for a certain period of time, the response handler 612 may instruct the deletion module 609 to delete the voice sample from the raw audio repository 608. In some cases, the deletion module 609 may be instructed to delete the full call recording along with the enhanced quality portion of the call recording. In various embodiments, the deletion module 609 may be capable of compressing call recordings and certain portions thereof. In some embodiments, where the voice sample is contained in a portion of a call recording, instead of deleting the entire call recording, the deletion module 609 may compress the call recording such that the portion of the call recording containing the voice sample is reduced from the enhanced recording quality to a lower recording quality to reduce a storage size of the call recording. Thus, computer storage resources may be preserved when a user chooses to not enable the voice authentication capability.

In some cases, the user response may indicate that the user wants to opt out of enrollment into voice authentication capability. For example, after receiving a declination of the voice authentication capability enablement, the user may be prompted as to whether he/she would like to opt out of future voice authentication enrollment. In such cases where the user chooses to opt out, the response handler 612 may store the opt out response in optout repository 614 so that when the user calls the electronic service provider, the eligibility API 621 will indicate to the IVR voice application 601 that the user has opted out of voice authentication capability enrollment, and the user's voice sample will not be recorded for enrolling in voice authentication. Similarly, the native mobile application 615 may provide a user account management interface for the user to opt out of voice authentication, in which case, the native mobile application 615 may instruct the response handler 612 to store the opt out decision in the optout repository 614, delete any voice samples of the user through the deletion module 609, and delete any voiceprint of the user stored in the biometric repository 613. In cases where the user selects to disable the voice authentication capability through the user account management interface, the response handler 612 may delete any voiceprint of the user stored in the biometric repository 613.

At a future time, after the voice authentication capability has been enabled, the user may call the electronic service provider. The IVR voice application 601 may capture a voice sample of the user during the call and request a determination from the identity authentication API 617 as to whether the voice sample matches a voiceprint for the user account corresponding to the device ID calling the electronic service provider. The identity authentication API 617 may query the biometric repository 613 and determine whether the voice sample matches a voiceprint for the user account. If there is a match, the user may be authenticated for the call.

In some embodiments, where there is not a match, the identity authentication API 617 may send a request to the risk API 618 to determine whether the voice sample matches a voiceprint in a fraud watchlist 619. The risk API 618 may be able to determine whether the voice sample matches any of the voiceprints in the fraud watchlist 619, which may correspond to known fraudsters. If the risk API 618 determines that the voice sample matches a voiceprint found in the fraud watchlist 619, the risk API 618 may respond to the identity authentication API 617 with a response indicating that the user who called is associated with voiceprint in the fraud watchlist 619. In such cases, the identity authentication API 617 may respond to the IVR voice application 601 with a response indicating that the user is associated with fraud. In various embodiments, when the user is determined to be associated with fraud, actions may be taken to stop the user from attempting to conduct fraud. For example, in one case, the device ID may be tagged as associated with fraud and user activity associated with the device ID may be further monitored and/or limited/prevented.

Figure 7:
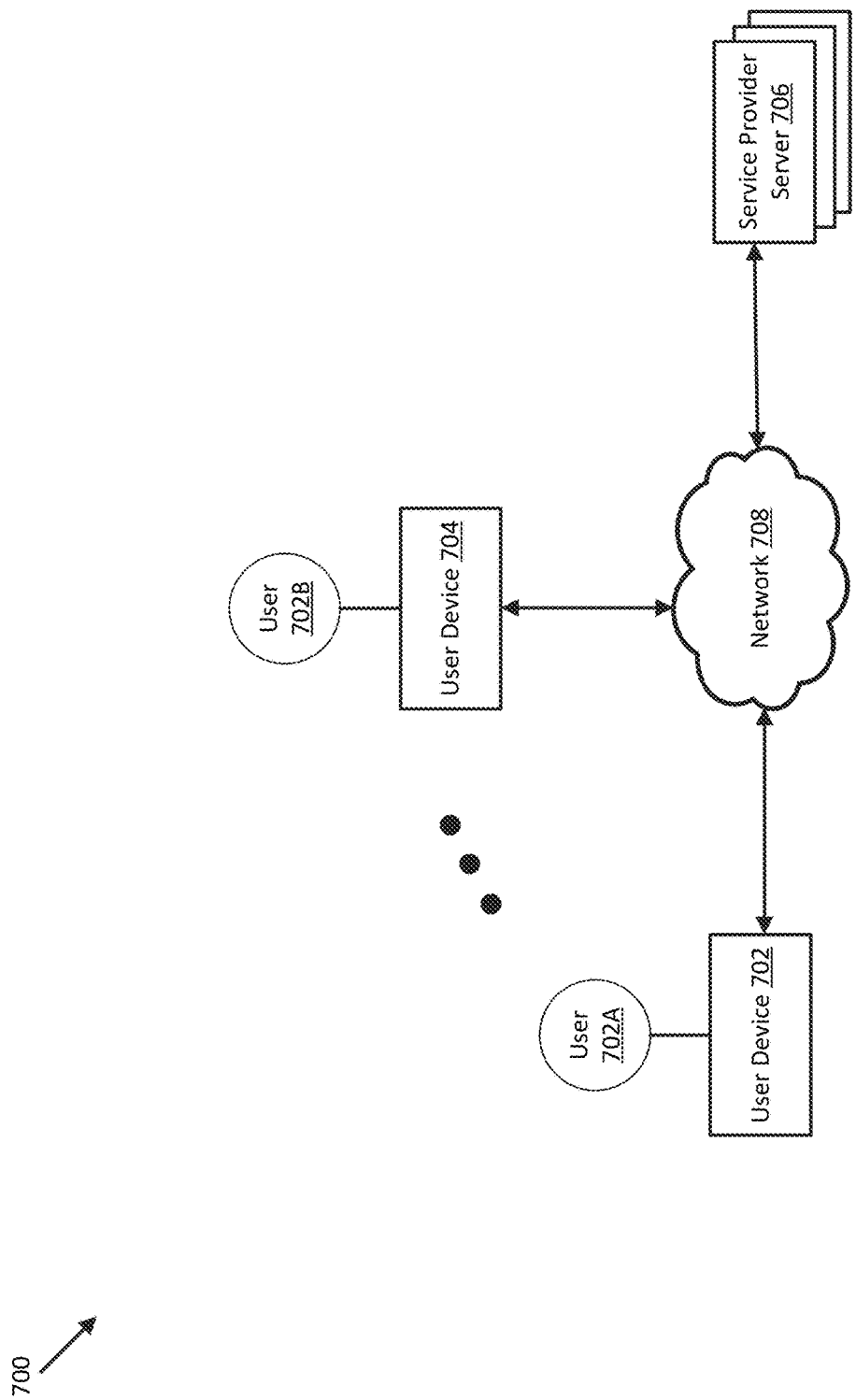
FIG. 7 illustrates a block diagram of a networked system suitable for implementing one or more embodiments of the present disclosure.

Referring now to FIG. 7, a block diagram of a networked system 700 configured to facilitate one or more processes in accordance with various embodiments of the present disclosure is illustrated. System 700 includes a user device 702, a user device 704, and an electronic service provider server(s) 706. A user 702A is associated with user device 702, where user 702A can provide an input to service provider server 706 using user device 702. A user 702B is associated with user device 704, where user 702B can provide an input to service provider server 706 using user device 702B.

User device 702, user device 704, and service provider server 706 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 700, and/or accessible over a network 708. Each of the memories may be non-transitory memory. Network 708 may be implemented as a single network or a combination of multiple networks. For example, in various embodiments, network 708 may include the Internet or one or more intranets, landline networks, and/or other appropriate types of networks.

User device 702 may be implemented using any appropriate hardware and software configured for wired and/or wireless communication over network 708. For example, in some embodiments, user device 702 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 702 may include one or more browser applications which may be used, for example, to provide a convenient interface to facilitate responding to recipient account detail requests over network 708. For example, in one embodiment, the browser application may be implemented as a web browser configured to view information available over the internet and respond to requests sent by service provider server 706. User device 702 may also include one or more toolbar applications which may be used, for example, to provide client-side processing for performing desired tasks in response to operations selected by user 702A. In one embodiment, the toolbar application may display a user interface in connection with the browser application.

User device 702 may further include other applications as may be desired in particular embodiments to provide desired features to user device 702. For example, the other applications may include an application to interface between service provider server 706 and the network 708, security applications for implementing client-side security features, programming client applications for interfacing with appropriate application programming interfaces (APIs) over network 708, or other types of applications. In some cases, the APIs may correspond to service provider server 706. The applications may also include email, texting, voice, and instant messaging applications that allow user 702A to send and receive emails, calls, and texts through network 708, as well as applications that enable the user to communicate to service provider server 706. User device 702 includes one or more device identifiers which may be implemented, for example, as operating system registry entries, cookies associated with the browser application, identifiers associated with hardware of user device 702, or other appropriate identifiers, such as those used for user, payment, device, location, and or time authentication. In some embodiments, a device identifier may be used by service provider server 706 to associate user 702A with a particular account maintained by the service provider server 706. A communications application with associated interfaces facilitates communication between user device 702 and other components within system 700. User device 704 may be similar to user device 702.

Service provider server 706 may be maintained, for example, by an online service provider which may provide electronic transaction services. In this regard, service provider server 706 includes one or more applications which may be configured to interact with user device 702 and user device 704 over network 708 to facilitate the electronic transaction services. Service provider server 706 may maintain a plurality of user accounts (e.g., stored in a user account database accessible by service provider server 706), each of which may include account information associated with individual users. Service provider server 706 may perform various functions, including communicating over network 708 with a payment network and/or other network servers capable a transferring funds between financial institutions and other third-party providers to complete transaction requests and process transactions.

Figure 8:
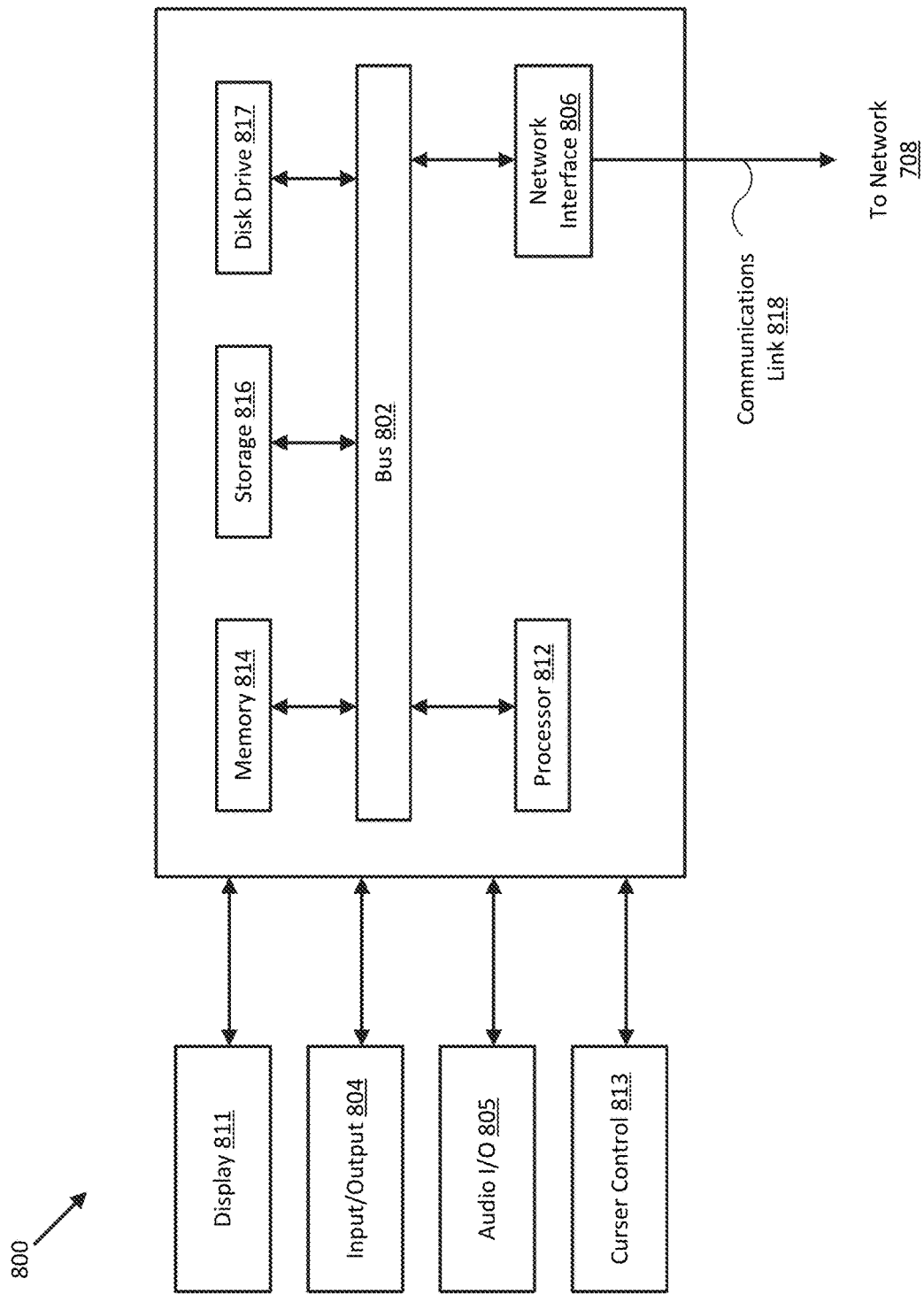
FIG. 8 illustrates a block diagram of a computer system in accordance with one or more embodiments of the present disclosure.

FIG. 8 illustrates a block diagram of a computer system 800 suitable for implementing one or more embodiments of the present disclosure. It should be appreciated that each of the devices utilized by users, entities, and service providers (e.g., computer systems) discussed herein may be implemented as computer system 800 in a manner as follows.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons or links, etc., and sends a corresponding signal to bus 802. I/O component 804 may also include an output component, such as a display 811 and a cursor control 813 (such as a keyboard, keypad, mouse, etc.). I/O component 804 may further include NFC communication capabilities. An optional audio I/O component 805 may also be included to allow a user to use voice for inputting information by converting audio signals. Audio I/O component 805 may allow the user to hear audio. A transceiver or network interface 806 transmits and receives signals between computer system 800 and other devices, such as another user device, an entity server, and/or a provider server via network 708. In one embodiment, the transmission is wireless, although other transmission mediums and methods may also be suitable. Processor 812, which may be one or more hardware processors, can be a micro-controller, digital signal processor (DSP), or other processing component, processes these various signals, such as for display on computer system 800 or transmission to other devices via a communication link 818. Processor 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor 812 and other components by executing one or more sequences of instructions contained in system memory component 814. Logic may be encoded in a computer-readable medium, which may refer to any medium that participates in providing instructions to processor 812 for execution. Such a medium may take many forms, including but not limited to, non-volatile media, volatile media, and transmission media. In various implementations, non-volatile media includes optical or magnetic disks, volatile media includes dynamic memory, such as system memory component 814, and transmission media includes coaxial cables, copper wire, and fiber optics, including wires that comprise bus 802. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 818 to the network 708 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A computer system comprising:
   a non-transitory memory storing instructions; and
   one or more hardware processors configured to execute the instructions and cause the computer system to perform operations comprising:
   based on a real-time audio communication between a user device corresponding to a user and a communication system associated with a service provider, determining that the user is eligible for establishing a voice authentication;
   initiating a recording of a portion of the real-time audio communication at a first recording quality;
   enhancing the first recording quality for the portion of the real-time audio communication to a second recording quality that is enhanced with respect to the first recording quality;
   recording a voice sample for the portion of the real-time audio communication at the second recording quality until the voice sample fulfills a threshold;
   after the voice sample fulfills the threshold, reverting the recording of the real-time audio communication to the first recording quality; and
   enabling the voice authentication based on the voice sample.

2. The computer system of claim 1, wherein the operations further comprise:
   causing a notification to be presented in a mobile application corresponding to the user device, wherein the notification includes a prompt for the user to enable the voice authentication;
   receiving a request to enable the voice authentication; and
   converting the voice sample into a voiceprint usable in the voice authentication.

3. The computer system of claim 1, wherein the determining that the user is eligible for establishing the voice authentication comprises determining that the user has initiated a number of real-time audio communications with the communication system that exceeds a threshold number of times.

4. The computer system of claim 1, wherein the determining the user is eligible for establishing the voice authentication comprises determining that the user is located within an eligible geofence.

5. The computer system of claim 1, wherein the recording the real-time audio communication includes prompting the user provide one or more words for the voice sample when recording the portion of the real-time audio communication at the second recording quality.

6. The computer system of claim 5, wherein the operations further comprise:
storing the recording of the real-time audio communication and metadata associated with the portion of the real-time audio communication, wherein the metadata includes timestamps indicating a location of the portion within the recording of the real-time audio communication.

7. The computer system of claim 1, wherein the operations further comprise:
determining that the user does not have a mobile application installed on the user device for enabling the voice authentication; and
sending, to a user device associated with the user, a link to a web application configured to allow the user to enable the voice authentication.

8. A method comprising:
recording, by a computer system, an active audio communication between a user device and a server system at a first recording quality;
determining that a user account associated with the user device is eligible for establishing voice authentication for future audio communications between the user device and the server system;
adjusting, by the computer system, the first recording quality for a portion of the active audio communication to a second recording quality higher than the first recording quality;
recording, by the computer system, a voice sample during the portion of the active audio communication at the second recording quality until the voice sample fulfills a threshold;
after the voice sample fulfills the threshold, reverting, by the computer system, the recording of the active audio communication to the first recording quality; and
prompting, by the computer system, the user device to enable the voice authentication.

9. The method of claim 8, further comprising converting, by the computer system, the voice sample into a voiceprint for use in the voice authentication in response to receiving an acceptance from the user device to enable the voice authentication.

10. The method of claim 8, further comprising:
identifying, by the computer system, an account corresponding to a phone number for the user device engaged in the active audio communication; and
determining, by the computer system, that the account does not have an active mobile application, wherein the prompting the user device to enable the voice authentication comprises sending a prompt to the user device via an email that includes a link to a web application.

11. The method of claim 8, further comprising:
receiving, by the computer system, a declination of a prompt to enable the voice authentication; and
deleting, by the computer system, the recording of the portion of the audio communication.

12. The method of claim 8, further comprising
receiving, by the computer system, a declination to enable the voice authentication; and
compressing, by the computer system, the recording including the voice sample.

13. The method of claim 8, further comprising:
determining, by the computer system, that the user device is engaged in a second active audio communication after enabling the voice authentication;
comparing, by the computer system, a second voice sample of a user of the user device to a voiceprint for the enabled voice authentication;
determining, by the computer system, that the second voice sample matches the voiceprint; and
authenticating, by the computer system, the user in response to the voice sample matching the voiceprint.

14. The method of claim 13, further comprising:
prompting, by the computer system, a user of the user device to speak a set of words for the voice authentication; and
collecting, by the computer system, the second voice sample as the user speaks for the voice authentication.

15. The method of claim 8, wherein the prompting the user device to enable the voice authentication includes sending a request to the user device to complete a one-time password security challenge.

16. A non-transitory machine-readable medium having instructions stored thereon, wherein the instructions are executable to cause a machine of a system to perform operations comprising:
determining that a user is engaged in a communication being recorded at a first recording quality;
recording a voice sample of the user during the communication at a second recording quality that is enhanced in relation to first recording quality;
comparing the voice sample of the user to a voiceprint that was generated based on a portion of a recorded previous communication that was recorded at the second recording quality, wherein the portion recorded at the second recording quality was enhanced in relation to a remaining portion of the recorded previous communication;
reverting the communication to being recorded at the first recording quality;
determining that the voice sample matches the voiceprint; and
authenticating the user in response to the voice sample matching the voiceprint.

17. The non-transitory machine-readable medium of claim 16, wherein the operations further comprise:
prior to the communication:
recording the previous communication in which the user is engaged at the first recording quality;
determining that the user is eligible for establishing the voiceprint for voice authentication;
enhancing the first recording quality to the second recording quality for the portion of the previous communication during the recording the previous communication;
prompting the user to enable the voice authentication; and
converting the portion of the recorded previous communication into the voiceprint that is usable in the voice authentication based on a user selection to enable the voice authentication.

18. The non-transitory machine-readable medium of claim 17, wherein the prompting the user to enable the voice authentication comprises causing a notification to be presented in a mobile application corresponding to the user, wherein the notification includes a prompt to enable the voice authentication.

19. The non-transitory machine-readable medium of claim 17, wherein the operations further comprise:
receiving a request to disable the voice authentication; and
deleting the voiceprint.

20. The non-transitory machine-readable medium of claim 17, wherein the operations further comprise:
   providing an audio command in the communication to the user to provide a voice sample for the portion of the communication.

\* \* \* \* \*